United States Patent
Nicholson et al.

(10) Patent No.: US 8,478,134 B2
(45) Date of Patent: Jul. 2, 2013

(54) COMPRESSION OF GENERATED OPTICAL CONTINUUM UTILIZING HIGHER-ORDER-MODE FIBER

(75) Inventors: Jeffrey W. Nicholson, Morristown, NJ (US); Siddharth Ramachandran, Boston, MA (US)

(73) Assignee: OFS Fitel, LLC, Norcross, GA (US)

( * ) Notice: Subject to any disclaimer, the term of this patent is extended or adjusted under 35 U.S.C. 154(b) by 783 days.

(21) Appl. No.: 12/584,096

(22) Filed: Aug. 31, 2009

(65) Prior Publication Data
US 2011/0052197 A1 Mar. 3, 2011

(51) Int. Cl.
*H04B 10/04* (2006.01)
*H04B 10/12* (2006.01)

(52) U.S. Cl.
USPC ........... 398/194; 398/189; 398/192; 398/193; 398/200; 398/201

(58) Field of Classification Search
USPC ............... 398/182, 200, 201, 189, 190, 191, 398/192, 193, 194; 385/28, 122; 372/6, 25
See application file for complete search history.

(56) References Cited

U.S. PATENT DOCUMENTS

| | | | |
|---|---|---|---|
| 6,249,630 B1 | 6/2001 | Stock et al. | |
| 6,775,447 B2 | 8/2004 | Nicholson et al. | |
| 6,856,737 B1 | 2/2005 | Parker et al. | |
| 7,076,174 B2 | 7/2006 | Watanabe et al. | |
| 7,228,029 B1* | 6/2007 | Ramachandran et al. | 385/28 |
| 7,233,727 B2 | 6/2007 | Hirano et al. | |
| 2006/0120418 A1* | 6/2006 | Harter et al. | 372/30 |
| 2006/0233554 A1 | 10/2006 | Ramachandran et al. | |
| 2008/0138011 A1* | 6/2008 | Ramachandran | 385/27 |
| 2011/0110671 A1* | 5/2011 | Bogoni et al. | 398/140 |

* cited by examiner

*Primary Examiner* — Danny Leung
*Assistant Examiner* — Daniel Dobson
(74) *Attorney, Agent, or Firm* — Law Offices of Wendy W. Koba, Esq.

(57) ABSTRACT

An arrangement for providing pulse compression at the output of an optical continuum source (advantageously used in spectral slicing applications) includes a section of higher-order mode (HOM) fiber configured to exhibit a predetermined dispersion in at least a portion of the predetermined wavelength range and an effective area greater than 40 μm², the dispersion of the HOM fiber selected to compensate for the dispersion introduced by the optical continuum source. The HOM fiber generates a compressed pulse output therefrom. An input mode converter is used to convert the created continuum from the fundamental mode associated with the conventional continuum sources to the higher-order mode(s) supported by the HOM fiber used to perform pulse compression. A bandpass filter is used to limit the bandwidth of the continuum signal to that associated with both the efficient conversion range of the mode converter and desired dispersion characteristic of the HOM fiber.

20 Claims, 5 Drawing Sheets

COMPRESSION OF GENERATED OPTICAL CONTINUUM UTILIZING HIGHER-ORDER-MODE FIBER

TECHNICAL FIELD

The present invention relates to the creation of compressed output pulses from a continuum generation source and, more particularly, to the utilization of one or more sections of higher-order-mode (HOM) fiber in conjunction with a fiber-based continuum generation source to remove accumulated spectral phase and compress the output into ultrashort (e.g., femtosecond (fs), generally sub-picosecond) optical pulses.

BACKGROUND OF THE INVENTION

There are applications in the fiber optics field in which a high power, low noise, broadband light source (continuum) is of particular interest. For example, efforts are now being made toward "spectral slicing"; that is, using a single optical source to generate a plurality of signals of different wavelengths (i.e., wavelength division multiplexed (WDM) signals). Such an application thus has the potential for replacing many lasers with a single light source. Other applications include, but are not limited to, frequency metrology, device characterization, dispersion measurements made on specialty fibers, and the determination of transmission characteristics of gratings. All of these various diagnostic tools may be greatly enhanced by the availability of a broadband source with the ability to create a plurality of different signal wavelengths.

In general, continuum generation involves the launching of relatively high power laser pulses into an optical fiber, waveguide or other microstructure, wherein the laser pulse train undergoes significant spectral broadening due to nonlinear interactions in the fiber. Current efforts at continuum generation, typically performed using light pulses having durations on the order of picoseconds ($10^{-12}$ sec) in kilometer lengths of fiber, have unfortunately shown degradation of coherence in the generating process.

A relatively new type of germanium-doped silica fiber with low dispersion slope and a small effective area, referred to hereinafter as "highly nonlinear fiber", or HNLF, has recently been developed. Although the nonlinear coefficients of HNLF are still smaller than those obtained with small core microstructured fibers, the coefficients are several times greater than those of standard transmission fibers, due to the small effective area of HNLF. Continuum generation using an HNLF and a femtosecond fiber laser has been reported from various sources. One prior art arrangement utilizes an HNLF-based continuum source formed from a number of separate sections of HNLF fiber that have been fused together, each having a different dispersion value at the light source wavelength and an effective area between five and fifteen square microns. Another type of HNLF-based continuum source uses a post-fabrication process to modify the dispersion values of the HNLF and further extend the spectral boundaries of the generated continuum.

For the particular application of spectral slicing, the spectral phase accumulated during the continuum generation process must be removed to achieve the desired "ultrashort" (e.g., fs or sub-picosecond) output pulse width. More particularly, dispersion compensation is required to nullify the negative dispersion created during signal propagation through HNLF. In the past, this dispersion compensation has been accomplished by using bulk optic components, such as prism pairs. It is preferred to provide an "all fiber" solution, eliminating the need for bulk optics. However, at short wavelengths (i.e., wavelengths shorter than the zero dispersion wavelength of HNLF at approximately 1300 nm-1400 nm), the continuum exiting the HNLF is negatively chirped and requires a positive dispersion fiber for recompression. Achieving positive dispersion in fibers at short wavelengths is difficult, and usually requires a microstructured fiber or photonic bandgap fiber. Both of these fibers, however, have a relatively small effective area $A_{\mathit{eff}}$, on the order of 5-10 $\mu m^2$, and as a result suffer from nonlinearities.

Thus, a need remains in the art for an all-fiber arrangement for compressing spectrally sliced components from a continuum source down to fs levels.

SUMMARY OF THE INVENTION

The need remaining in the prior art is addressed by the present invention, which relates to the creation of compressed output pulses from a continuum generation source and, more particularly, to the utilization of one or more sections of higher-order-mode (HOM) fiber in conjunction with a continuum generation source to remove the accumulated spectral phase and compress the output into ultrashort (e.g., fs) pulses.

In accordance with the present invention, a section of HOM fiber is disposed at the output of a continuum source and used to remove at least a portion of the accumulated spectral phase (i.e., performing dispersion compensation which could be positive or negative in sign depending on the nature of the phase accumulated during generation of the continuum), thus creating the desired pulse compression. The HOM fiber exhibits a defined dispersion characteristic (magnitude and slope) as a function of wavelength, with a region of, for example, positive dispersion over a defined wavelength range. An input mode converter (such as a long period grating (LPG)) is disposed at the input of the HOM fiber in order to convert the propagating mode from the fundamental $LP_{01}$ mode at the continuum source output into the higher-order modes (such as $LP_{02}$) supported by the HOM fiber. The input mode converter also has a defined bandwidth of operation over which it provides strong mode conversion. A bandpass filter is disposed along the signal path to remove wavelength components beyond the preferred ranges associated with both the HOM fiber desired dispersion characteristic and the input mode converter area of strong mode conversion, thus providing dispersion-compensated, compressed output pulses. The length of the HOM fiber is determined by the amount of dispersion compensation that is required to compensate both linear and nonlinear sources of optical phase and pre-chirp.

In one embodiment of the present invention, the bandpass filter is disposed at the output of the continuum source, presenting a bandwidth-limited continuum signal to the input mode converter. In this case, the spectral regions of the continuum output beyond the preferred operation regions of the input mode converter and HOM fiber are prevented from propagating any further along the signal path.

In another embodiment, the bandpass filter is disposed at the output of the HOM fiber and used to remove any remaining wavelength components that have not experienced dispersion compensation are removed from the output pulse stream, providing only dispersion-compensated compressed output pulses.

In yet another embodiment of the present invention, a second mode converter (e.g., LPG) may be disposed at the output of the HOM fiber to re-convert the mode of the compressed pulses back to the fundamental $LP_{01}$ mode, if desired. In this case, the bandpass filter will also take into account the operable bandwidth of the second mode converter.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
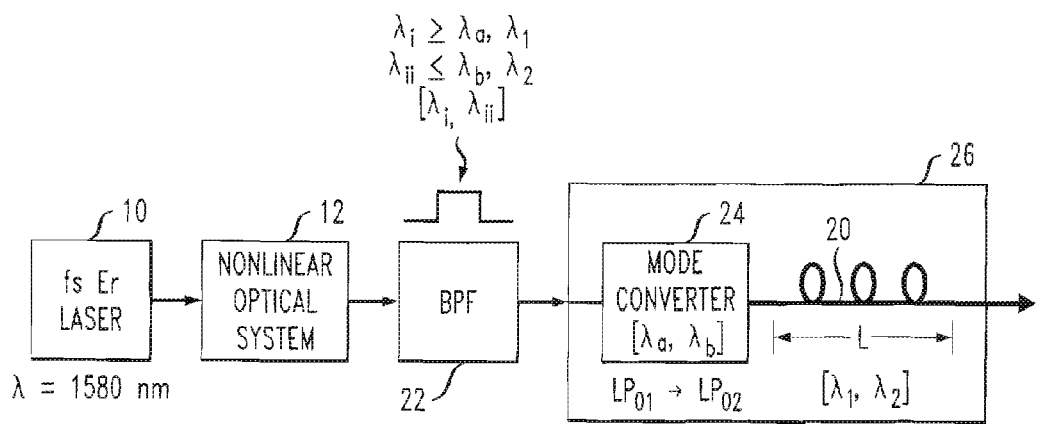
FIG. 1 illustrates an exemplary continuum source including HOM fiber-based pulse compression in accordance with the present invention.

FIG. 1 illustrates an exemplary arrangement for providing pulse compression at the output of a continuum source in accordance with the present invention. In this particular embodiment, an exemplary continuum source includes a femtosecond (fs) erbium laser pulse source 10 which is coupled to a nonlinear optical system 12. An exemplary laser pulse source generates pulses at an input wavelength of, for example, 1580 nm, with a repetition rate of 33 MHz, an average power of 7 mW and a full width half-maximum (FWHM) pulse width of 188 fs. An exemplary nonlinear optical system comprises a section of highly-nonlinear fiber (HNLF). Although not shown in this drawing, a fiber amplifier may be included in the signal path between laser 10 and nonlinear optical system 12 to boost the signal power entering system 12.

Figure 2:
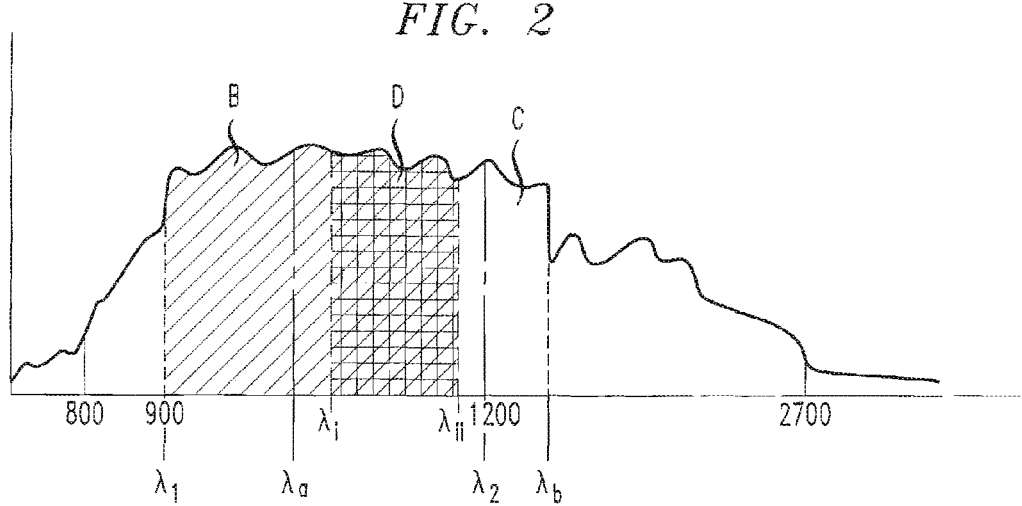
FIG. 2 is a graph of an exemplary continuum output from a nonlinear optical system.

The nonlinear characteristics of optical system 12 are known to introduce different degrees of chromatic dispersion into the propagating pulses, which results in generating a continuum output that may extend over a wavelength range from, for example, 850 nm to over 2.7 μm. FIG. 2 illustrates an exemplary continuum which can be generated by the combination of pulse source 10 and nonlinear optical system 12. A complete description of this exemplary all-fiber continuum source can be found in U.S. Pat. No. 6,775,447, issued to J. W. Nicholson et al. on Aug. 10, 2004, assigned to the assignee of this application and hereby incorporated by reference.

As mentioned above, a continuum as shown in FIG. 2 can thereafter be "sliced" into a plurality of ultrashort pulses at different wavelengths along the spectrum. These wavelength slices are suitable for use in applications such as dense wavelength division multiplexing (DWDM), enabling a plurality of different wavelength sources to be created from a single laser source. Spectral slicing of a continuum is also advantageous inasmuch as the sliced pulse is temporally synchronized with the original generating pulse. However, to achieve ultrashort pulse widths, the spectral phase (positive or negative dispersion) accumulated along nonlinear optical system 12 during continuum generation must be removed (or at least partially removed). Dispersion, expressed as ps/nm-km, is a measure of the shift in phase between the input and output signals. The dispersion slope; that is, the rate of change in dispersion along an optical signal path, is another factor which influences the characteristics of the signal present at the output of nonlinear optical system 12. Both the dispersion and dispersion slope will be characterized by the particular parameters of the nonlinear optical system used for continuum generation.

In accordance with the present invention, a section of higher-order mode (HOM) fiber 20 is used to introduce dispersion into the generated continuum, with the length L of HOM fiber 20 selected to provide the desired degree of dispersion (and associated dispersion slope) so as to compensate, at least in part, for the dispersion present at the output of nonlinear optical system 12. In most cases and wavelengths of interest, the generated continuum will initially exhibit normal (negative) dispersion, and HOM fiber 20 is thus configured to provide anomalous (positive) dispersion. The slope of the dispersion present in the output from nonlinear optical system 12 is often an overlooked parameter, but provides information regarding the evolution of the phase as the signal propagates through system 12. The characteristics of HOM fiber 12 may therefore be designed to essentially match the dispersion slope present in the signal applied as an input thereto.

HOM fiber is known is exhibit high, positive dispersion in a certain wavelength range (for example, a dispersion D of +55 ps/nm-km at 1080 nm) and has an effective area ($A_{eff}$) which is several times larger than the $A_{eff}$ that can be achieved with prior art pulse compression techniques (the $A_{eff}$ of an HOM fiber is typically on the order of 40-50 $\mu m^2$, compared with 5-10 $\mu m^2$ for prior art fibers). It is to be understood that in certain situations, the continuum will exhibit anomalous dispersion and the section of HOM fiber is thus configured to introduce a sufficient amount of negative dispersion to allow for ultra-short pulses to be created.

Figure 3:
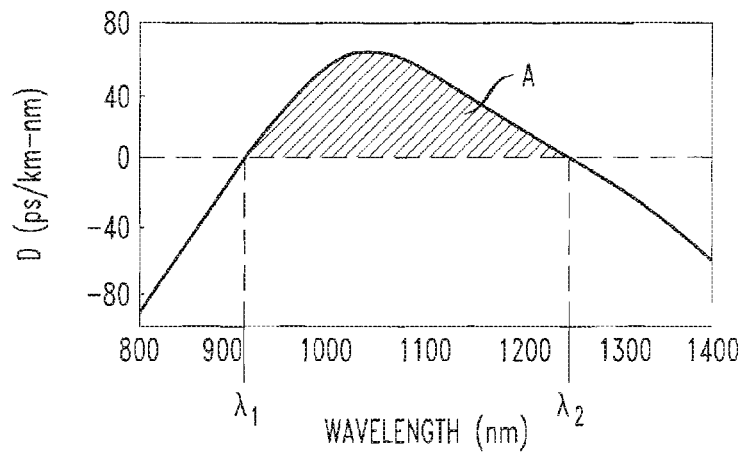
FIG. 3 is a graph of the dispersion characteristic of an exemplary section of HOM fiber, showing a region of positive dispersion along a wavelength range of interest.

FIG. 3 depicts the dispersion exhibited by an exemplary section of HOM fiber with shaded area A indicating the wavelength range ($\lambda_1$-$\lambda_2$) associated with creating positive dispersion (i.e., from about 900 nm to 1200 nm). The particular region of positive dispersion is associated with the specific parameters of the HOM fiber and, therefore, may be adjusted so as to enable the wavelength range of positive dispersion to correlate with the wavelength range of the generated continuum.

Figure 4:
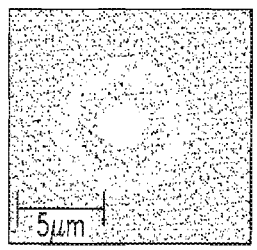
FIG. 4 is an image of the $LP_{02}$ mode optical signal supported by an HOM fiber.

FIG. 4 is a photograph of an optical signal propagating as a higher mode signal (in this case, the $LP_{02}$ mode) within an exemplary HOM fiber. For this exemplary fiber, the effective area ($A_{eff}$) was measured to be approximately 44 $\mu m^2$ for an operating wavelength of 1080 nm. For the purposes of the present invention, both of these properties (positive dispersion and relatively large effective area in the desired wavelength range) of the HOM fiber allow for a pulse compression configuration to be achieved and used in conjunction with the continuum source.

Inasmuch as the output continuum from nonlinear optical system 12 will be propagating as a fundamental $LP_{01}$ mode signal, a mode converter is required in the arrangement of the present invention to transition the propagating fundamental $LP_{01}$ mode into a higher-order mode supported by HOM fiber 20. Referring to FIG. 1, an input mode converter 24 is disposed between the output of nonlinear optical system 12 and the input of HOM 20 to transfer the energy of the propagating signal from the fundamental mode into a higher-order mode (for example, the $LP_{02}$ mode) associated with HOM fiber 20. Input mode converter 24 also exhibits a wavelength range, shown as $(\lambda_a-\lambda_b)$ in FIG. 1, over which it provides strong mode conversion will take place. The combination of HOM fiber 20 with input mode converter 24 is shown in FIG. 1 as forming an HOM module 26.

In comparing the continuum spectrum of FIG. 2 with the dispersion properties of HOM fiber 20, it is clear that the wavelength range $(\lambda_1-\lambda_2)$ along which HOM fiber 20 provides positive dispersion is smaller than that of the generated continuum (the wavelength range $(\lambda_1-\lambda_2)$ shown as shaded area B in FIG. 2. Furthermore, any light that is not coupled into the $LP_{02}$ mode within input mode converter 24, but remains in the $LP_{01}$ mode, will continue to propagate and exhibit an increasing (and undesired) accumulation of dispersion as it passes through HOM fiber 20. The wavelength range $(\lambda_a-\lambda_b)$ over which the strongest mode conversion takes place is shown as shaded area C in FIG. 2. It is to be understood that the shown values are exemplary and, in fact, $\lambda_a$ may be less than $\lambda_1$ and/or $\lambda_b$ may be greater than $\lambda_2$.

Therefore, in accordance with the present invention, a bandpass filter (BPF) 22 is included in the pulse compression arrangement and selected to have a bandwidth $(\lambda_i-\lambda_{ii})$ no greater than the wavelength range associated with the positive dispersion characteristic of HOM fiber 20 $(\lambda_1-\lambda_2)$ and the operational bandwidth $(\lambda_a-\lambda_b)$ of input mode converter. This relation can be expressed as follows:

$$\lambda_i \geq \lambda_1, \lambda_a; \text{ and}$$

$$\lambda_{ii} \leq \lambda_2, \lambda_b.$$

An exemplary passband $(\lambda_i-\lambda_{ii})$ for BPF 22 is shown as shaded area D in FIG. 2. Obviously, a narrower bandwidth may be used, but a narrower bandwidth leads to longer compressed pulses at the output. Bandpass filter 22 may comprise any suitable type of filter, such as a grating filter, bulk optic device, or the like.

In the particular embodiment of FIG. 1, BPF 22 is disposed between nonlinear optical system 12 and input mode converter 24. Thus, BPF filter 22 will limit the wavelength range of the continuum signal applied as an input to input mode converter 24, avoiding the continued propagation of light in the unwanted $LP_{01}$ mode within the HOM fiber 20. Inasmuch as the bandwidth of BPF 22 is also selected to correspond with the wavelength region of positive dispersion within HOM 20, the signal thereafter applied to HOM 20 will experience dispersion compensation as pulse compression occurs.

Figure 5:
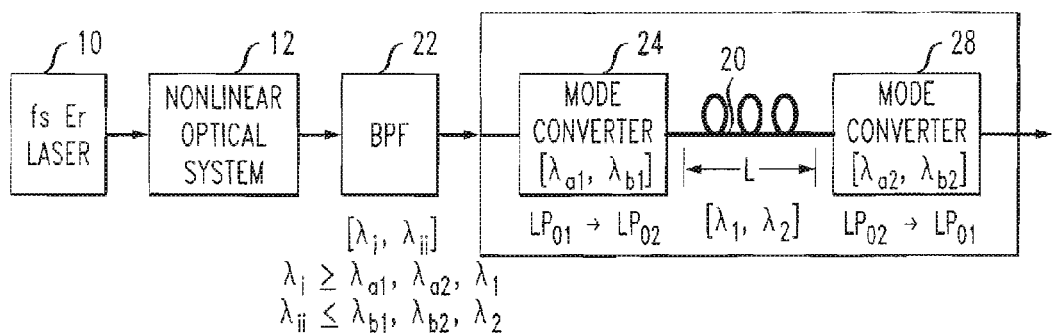
FIG. 5 shows another embodiment of the present invention, incorporating an output mode converter into the embodiment of FIG. 1.

FIG. 5 illustrates another embodiment of the present invention using the configuration of FIG. 1, where in this case, an output mode converter 28 is included within HOM module 26 and is disposed at the output of HOM fiber 20. The inclusion of a second mode converter provides for the re-conversion of the compressed output pulses back to a fundamental mode ($LP_{01}$) signal. Output mode converter 28 is shown as exhibiting strong mode conversion over a wavelength range $(\lambda_{a2}-\lambda_{b2})$, which may different from the wavelength region of input mode converter 24. In situations where an output mode converter is employed, BPF 22 is preferably configured to also take the properties of this device into account when selecting a preferred passband range.

Figure 6:
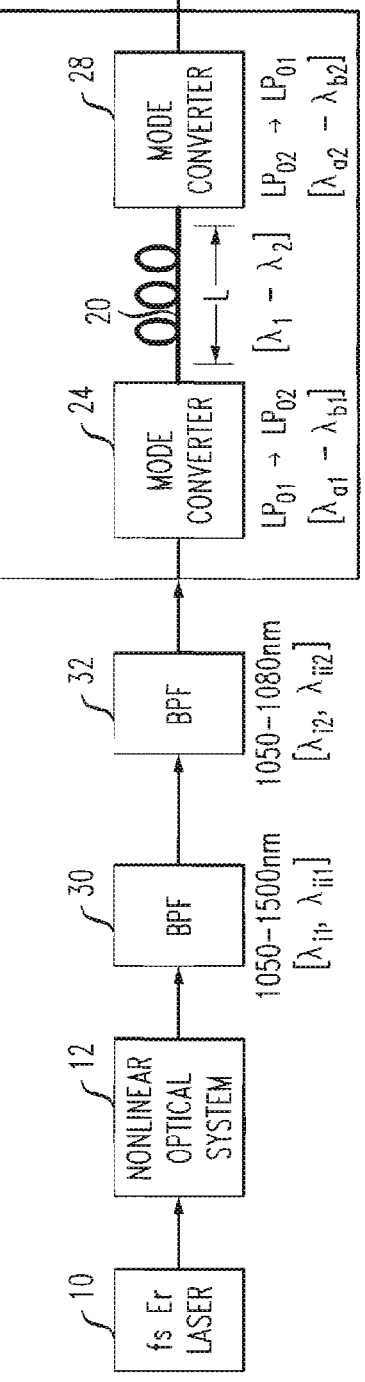
FIG. 6 shows yet another embodiment of the present invention, utilizing a pair of bandpass filters (of differing bandwidths) disposed in series at the output of the nonlinear optical system.

FIG. 6 illustrates a specific embodiment of the present invention which utilizes a pair of bandpass filters disposed in series between nonlinear optical system 12 and HOM fiber 20. In particular, this embodiment is shown as including a first bandpass filter 30 exhibiting a passband $(\lambda_{i1}-\lambda_{ii1})$ of, e.g., 1050-1500 nm and a second, narrower bandpass filter 32 exhibiting a passband $(\lambda_{i2}-\lambda_{ii2})$ of, e.g., 1050-1080 nm. Bandpass filters 30 and 32 are disposed in series between the output of nonlinear optical system 12 and the input to mode converter 24. Thus, input mode converter 24 is configured to provide strong mode conversion within the narrower 1050-1080 nm bandwidth of bandpass filter 32. It is to be understood that the passband values of these particular filters, as well as the use of a pair of filters (instead of a single filter or a larger number of filters), are exemplary only; various other in-line filtering arrangements may be used to properly limit the bandwidth of the signal applied to the HOM pulse compression module.

Figure 7:
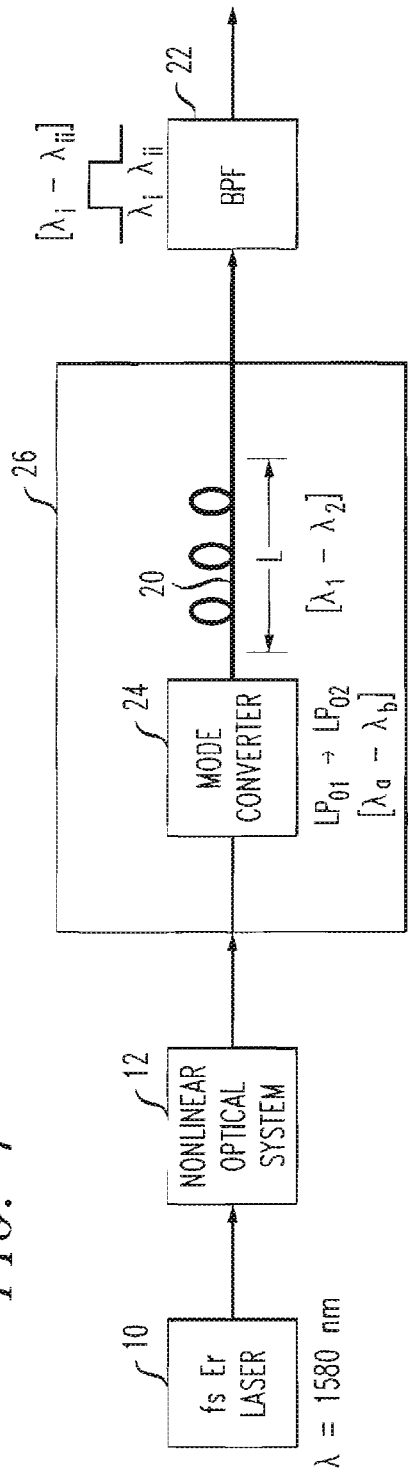
FIG. 7 illustrates an embodiment of the present invention where the bandpass filter is disposed at the output of the HOM fiber.
Figure 8:
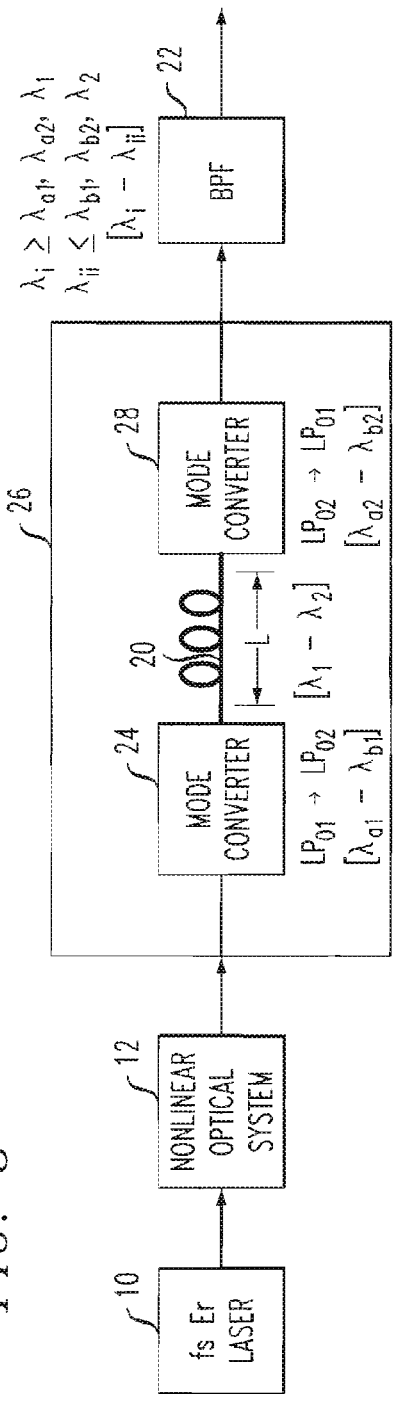
FIG. 8 shows a variation of the embodiment of FIG. 7, incorporating an output mode converter between the HOM fiber and the bandpass filter.

FIG. 7 illustrates an alternative embodiment of the present invention, in this case where BPF 22 is disposed at the output of HOM fiber 20. Without any prior filtering, the output pulses from HOM fiber 20 will include both dispersion-compensated compressed pulses (i.e., within the wavelength range $(\lambda_1-\lambda_2)$ associated with positive dispersion and a residual signal, perhaps a fundamental mode signal, which has experienced additional negative dispersion. In this case, BPF 22 is selected to have a passband that will prevent the further propagation of the residual portion of the signal, allowing only the dispersion-compensated compressed pulses to exit the arrangement. As with the embodiment of FIG. 5, the embodiment of FIG. 7 may be further configured to include an output mode converter, with BPF 22 disposed beyond output mode converter 28. FIG. 8 illustrates an exemplary pulse compression arrangement of the present invention utilizing both input mode converter 24 and output mode converter 28, with BPF 22 located beyond output mode converter 28. In this case, BPF 22 exhibits a bandwidth which also takes into account the bandwidth of output mode converter 28 $(\lambda_{a2}-\lambda_{b2})$ over which strong mode conversion will occur.

Figure 9:
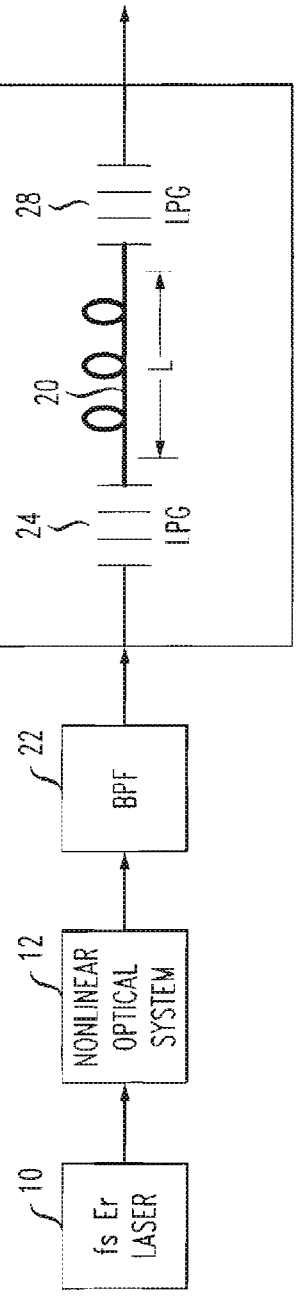
FIG. 9 illustrates a specific configuration of the present invention, using a pair of long period gratings (LPGs) as input and output mode converters.

FIG. 9 illustrates a particular configuration of the embodiment of the present invention illustrated in FIG. 5. In this configuration, input and output mode converters 24, 28 take the form of long period gratings (LPGs). The use of LPGs as mode converters is considered to be a preferred embodiment of the present invention, inasmuch as the LPGs can be directly formed in sections of optical fiber and fused to the terminations of HOM fiber 12 without introducing significant signal loss.

Figure 10:
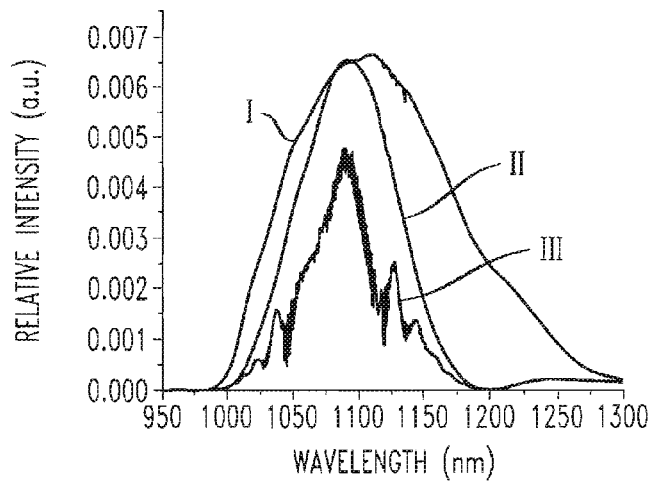
FIG. 10 is a graph plotting the transmission spectrum achieved for a continuum generated from femtosecond pulses at a wavelength of 1550 nm along the system of FIG. 5.

FIG. 10 graphs the generation of pulse compression from the output of nonlinear optical system 12 to the output of HOM module 26 for the embodiment of FIG. 9. Plot I illustrates the spectrum at the output of nonlinear optical system 12. Plot II is the narrowed spectrum created by using filters 30 and 32. Lastly, plot III shows the spectrum at the output of HOM module 26.

Figure 11A:
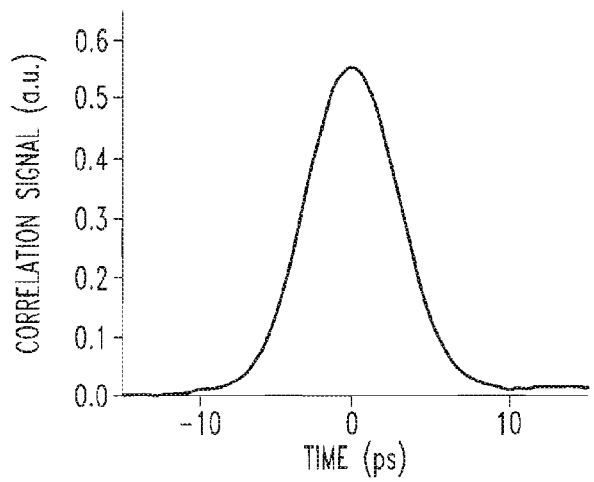
FIG. 11 contains plots of the autocorrelation signal before compression (FIG. 11(a)) and after compression within the HOM module of the present invention (FIG. 11(b)).
Figure 11B:
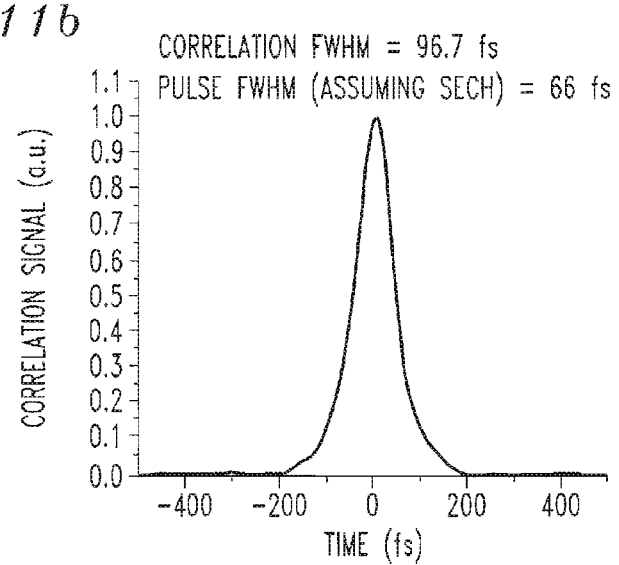

Autocorrelations of the filtered continuum were also measured at the input and output of HOM module 26, and the results are shown in FIG. 11. In particular, FIG. 11(a) illustrates the autocorrelation at the input to HOM module 26, and FIG. 11(b) illustrates the autocorrelation at the output of HOM module 26. Referring to the plot of FIG. 11(a), the time scale is shown as measured in picoseconds (ps) and the autocorrelation is shown to be several picoseconds in width. In contrast, the autocorrelation pulse time scale of FIG. 11(b) is measured in femtoseconds (fs) and is shown to be approximately 98 fs in width, which corresponds to a 66 fs pulse FWHM value. These results are associated with an HOM fiber 20 having a dispersion value D of +55 ps/nm-km and an effective area $A_{eff}$ of 44 µm$^2$. While other values of dispersion and effective area may be used, it is to be understood that in any case an HOM module formed in accordance with the present invention is capable of performing pulse compression for various types of optical continuum sources.

From the invention thus described, it will be obvious that the embodiments of the invention may be varied in many ways. Such various are not to be regarded as a departure from the spirit and scope of the invention, and all such modifications as would be obvious to one skilled in the art are intended for inclusion within the scope of the following claims.

What is claimed is:

1. A system for providing pulse compression of a spectrally-broadened optical continuum signal comprising a section of higher-order mode (HOM) fiber exhibiting a predetermined dispersion characteristic across at least a defined bandwidth ($\lambda_1$-$\lambda_2$) of the optical continuum signal, the predetermined dispersion characteristic selected to compensate, at least in part, for accumulated spectral phase present in the optical continuum signal within the defined bandwidth, the section of HOM fiber generating compressed optical pulses at the output thereof;

an input mode converter disposed at the input to the section of HOM fiber for converting a fundamental mode of said optical continuum signal into a higher-order mode optical continuum signal over a defined converter bandwidth ($\lambda_a$-$\lambda_b$); and a bandpass filter for receiving the optical continuum signal and limiting the optical continuum signal to a filtered bandwidth range ($\lambda_i$-$\lambda_{ii}$) over which dispersion compensation is performed within the HOM fiber wherein $\lambda_i \geq \lambda_1, \lambda_a$; and $\lambda_{ii} \leq \lambda_2, \lambda_b$ to provide dispersion-compensated, compressed optical output pulses over the filtered bandwidth range.

2. The system as defined in claim 1 further comprising:
an output mode converter coupled to the output of the section of HOM fiber for re-converting the higher-order mode compressed optical pulses into a fundamental mode output optical signal.

3. The system as defined in claim 1 wherein the bandpass filter is disposed prior to the input of the input mode converter.

4. The system as defined in claim 1 wherein the bandpass filter is disposed at the output of the section of HOM fiber.

5. The system as defined in claim 1 wherein the input mode converter comprises a long period grating (LPG).

6. The system as defined in claim 1 wherein the bandpass filter comprises a plurality of bandpass filters disposed in series, each having a different bandwidth.

7. The system as defined in claim 1 wherein the HOM fiber supports a higher order mode and the input mode converter provides conversion between the fundamental mode and the higher order mode.

8. The system as defined in claim 1 wherein the HOM fiber supports an $LP_{02}$ mode signal.

9. The system as defined in claim 1 wherein the HOM fiber exhibits an effective area greater than 40 µm$^2$ at a wavelength of 1080 nm.

10. The arrangement as defined in claim 1 wherein the HOM fiber exhibits an anomalous dispersion of at least +50ps/nm-km at a wavelength of 1080 nm.

11. A method of compressing optical pulses comprising the steps of:
a) generating a spectrally broadened optical continuum signal at a fundamental mode;
b) converting the optical continuum signal to a higher order mode signal over an operable wavelength range ($\lambda_a$-$\lambda_b$);
c) launching the converted signal of step b) into a section of higher-order mode (HOM) fiber with a dispersion and length selected to compensate for accumulated spectral phase present along a defined bandwidth ($\lambda_1$-$\lambda_2$);
d) filtering the optical signal to remove wavelengths beyond preferred wavelength ranges associated with the operation of steps b) and c), the removed wavelengths being less than a first defined wavelength $\lambda_i$ and greater than a second defined wavelength $\lambda_{ii}$, where $\lambda_i \geq \lambda_1, \lambda_a$; and $\lambda_{ii} \leq \lambda_2, \lambda_b$.

and;
e) creating compressed optical pulses at the output of the section of HOM fiber.

12. The method as defined in claim 11 wherein step a) includes the steps of:
i) providing an input optical pulse source operating at a first wavelength to generate an input optical pulse stream; and
ii) coupling the input optical pulse stream into a section of highly-nonlinear fiber (HNLF) and creating therein a spectrally broadened optical continuum signal at a fundamental mode.

13. The method as defined in claim 1 wherein step d) is performed prior to step c).

14. The method as defined in claim 11 wherein step d) is performed subsequent to step c).

15. The method as defined in claim 11 comprising the further steps of:
e) converting the compressed optical pulses created in step d) into a fundamental mode output optical signal.

16. The method as defined in claim 10 wherein in performing step c), the step further includes selecting a section of higher-order mode (HOM) fiber with an anomalous dispersion of at least +50ps/nm-km for a wavelength of 1080 nm.

17. An optical pulse source for generating sub-picosecond width optical pulses, comprising
an optical continuum signal generator including a source of input pulses at a first wavelength coupled to a section of highly-nonlinear fiber for generating a spectrally-broadened optical continuum output signal;
an input mode converter disposed beyond an output of the optical continuum signal generator for converting the fundamental mode of the generated optical continuum signal to a higher order mode optical continuum signal, the input mode converter having an operable bandwidth ($\lambda_a$-$\lambda_b$);
a section of higher-order mode fiber coupled to an output of the input mode converter, the section of higher-order mode fiber having a large effective area and exhibiting a predetermined dispersion characteristic across a bandwidth ($\lambda_1$-$\lambda_2$) that overlaps, at least in part, the optical continuum signal bandwidth so as to create a pulsed optical output signal having a sub-picosecond pulse width; and a bandpass filter for limiting the optical pulse source output to include dispersion-compensated compressed optical pulses, the bandpass filter having a passband ($\lambda_i$-$\lambda_{ii}$) where $\lambda_i \geq \lambda_1, \lambda_a$; and $\lambda_{ii} \leq \lambda_2, \lambda_b$.

18. An optical pulse source as defined in claim 17 wherein the section of higher-order mode fiber has an effective area greater than 40 µm² at a wavelength of 1080 nm.

19. An optical pulse source as defined in claim 17 wherein the section of higher-order mode fiber has an anomalous dispersion of at least +50ps/nm-km at a wavelength of 1080 nm.

20. The optical pulse source as defined in claim 17 further comprising an output mode converter coupled to an output of the section of higher-order mode fiber to re-convert the pulsed optical output signal into a fundamental mode output optical signal.

\* \* \* \* \*